(12) United States Patent
Tochino et al.

(10) Patent No.: US 11,197,077 B2
(45) Date of Patent: Dec. 7, 2021

(54) TRANSMISSION DEVICE, AND TRANSMISSION METHOD

(71) Applicant: NIPPON TELEGRAPH AND TELEPHONE CORPORATION, Tokyo (JP)

(72) Inventors: Takamitsu Tochino, Musashino (JP); Takashi Mitsui, Musashino (JP); Kota Asaka, Musashino (JP); Tomoya Hatano, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/976,357

(22) PCT Filed: Feb. 21, 2019

(86) PCT No.: PCT/JP2019/006593
§ 371 (c)(1),
(2) Date: Aug. 27, 2020

(87) PCT Pub. No.: WO2019/167800
PCT Pub. Date: Sep. 6, 2019

(65) Prior Publication Data
US 2021/0051382 A1    Feb. 18, 2021

(30) Foreign Application Priority Data

Mar. 1, 2018    (JP) .............................. JP2018-036800

(51) Int. Cl.
*H04Q 11/00*    (2006.01)
(52) U.S. Cl.
CPC ..... *H04Q 11/0066* (2013.01); *H04Q 11/0005* (2013.01); *H04Q 2011/0041* (2013.01); *H04Q 2011/0045* (2013.01)

(58) Field of Classification Search
CPC .......... H04Q 11/0066; H04Q 11/0005; H04Q 2011/0041; H04Q 2011/0045
(Continued)

(56) References Cited

U.S. PATENT DOCUMENTS

| 2008/0056721 A1* | 3/2008 | Mori ................... H04J 3/1617 398/100 |
| 2009/0067850 A1* | 3/2009 | Mizutani ............. H04J 3/0605 398/154 |

FOREIGN PATENT DOCUMENTS

WO    WO-98018222 A1    4/1998

OTHER PUBLICATIONS

WO009818222A1 (Google English Translation) (Year: 1998).*
(Continued)

*Primary Examiner* — Ted M Wang
(74) *Attorney, Agent, or Firm* — Harness, Dickey & Pierce, P.L.C.

(57) ABSTRACT

Transmitting devices used in an optical access system in which a plurality of the transmitting devices transmit an optical burst signal to a receiving device by time division multiple access, the transmitting devices each including an arithmetic processing unit, the arithmetic processing unit including: a data signal transmission instruction unit, the a data signal transmission instruction unit that outputs a first instruction for controlling transmission processing of a data signal on the basis of a requester's instruction; an optical signal control instruction unit that outputs a second instruction for controlling output processing of an optical signal on the basis of the requester's instruction; and an instruction output adjustment unit that adjusts a timing at which the first instruction is output and a timing at which the second instruction is output.

2 Claims, 7 Drawing Sheets

(58) Field of Classification Search
USPC .......................................................... 398/45
See application file for complete search history.

(56) References Cited

OTHER PUBLICATIONS

IEEE, "IEEE Standard for Ethernet Section 1." IEEE Std 802.3TM. 2015. Mar. 4, 2016, pp. 54-169.
IEEE, "IEEE Standard for Ethernet Section 3." IEEE Std 802.3TM. 2015. Mar. 4, 2016, pp. 16-174.
IEEE, "IEEE Standard for Ethernet Section 4." IEEE Std 802.3TM. 2015. Mar. 4, 2016, pp. 38-564.
IEEE, "IEEE Standard for Ethernet Section 6." IEEE Std 802.3TM. 2015. Mar. 4, 2016, pp. 77-586.
IEEE, "IEEE Standard for Ethernet Section 5." IEEE Std 802.3TM. 2015. Mar. 4, 2016, pp. 35-386.

* cited by examiner

Fig. 7

TRANSMISSION DEVICE, AND TRANSMISSION METHOD

CROSS-REFERENCE TO RELATED APPLICATIONS

This application is a 371 U.S. National Phase of International Application No. PCT/JP2019/006593, filed on Feb. 21, 2019, which claims priority to Japanese Application No. 2018-036800, filed on Mar. 1, 2018. The entire disclosures of the above applications are incorporated herein by reference.

TECHNICAL FIELD

The present invention relates to transmitting devices and a transmission method.

BACKGROUND ART

Ethernet (registered trademark) is a worldwide used wired network protocol and used by many standard network devices.

Among others, Ethernet (registered trademark) to which an optical transmission technology is applied and that defines a physical layer with an optical interface is entirely used in P2P (point-to-point) communication and is prevalent as an interface that allows for a long distance high speed communication (see NPL 1 to 4).

Use of the P2P network topology by an access network containing a plurality of network devices, particularly for long distance transmission, will increase the installation cost of the optical fiber and the occupied area of the intra-station unit. Then, a P2MP (point to multipoint) communication system is used in an access network, which uses the PON (Passive Optical Network) topology. In the P2MP communication system, a plurality of customer line optical network units share the optical fiber and the optical network unit, thus making it possible to decrease the installation cost of the optical fiber and the occupied area of the intra-station unit. The P2MP communication system using PON topology has a configuration defined by IEEE (Institute of Electrical and Electronics Engineers) (see NPL 5).

To perform the P2MP communication using PON topology, the station-side network device must be able to independently receive optical signals transmitted from a plurality of subscriber-side network device terminals. One communication method for achieving this is the optical TDMA (Time Division Multiple Access) method. In the optical TDMA method, as the subscriber-side network devices transmit the optical signals only when they transmit the data signals, the station-side network device may independently receive the optical signals transmitted from the subscriber-side network devices, respectively.

Technologies for achieving the optical TDMA communication include an optical burst transmission technology of a data signal. The optical burst transmission of the data signal may be achieved by combining the following three functions:
an optical signal control function that controls the intermittent transmission (optical burst transmission) of the optical signals according to the instructed timing;
a data signal transmission control function that controls the intermittent transmission of the data signal according to the instructed timing; and
a burst transmission timing control function that achieves the optical burst transmission of the data signal by adjusting the performance timing of the optical signal control function and transmission control function.

Generally, these three functions are implemented in an optical network unit large scale integration in the optical network unit, which is a PON dedicated device.

Figure 6:
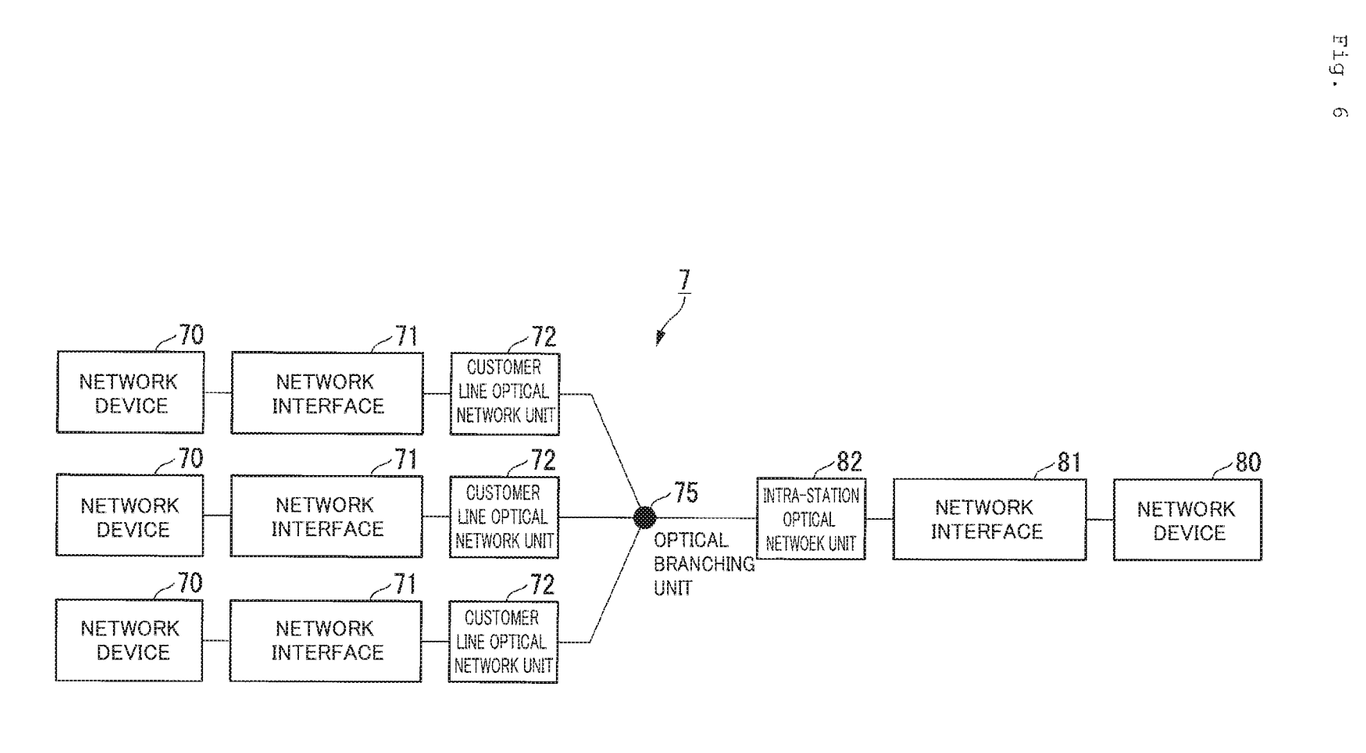
FIG. 6 is a network configuration including network devices connected using PON topology in the conventional technology.

FIG. 6 shows a network configuration in which the network devices are connected using PON topology in the conventional technology. In addition, FIG. 7 shows the simplest configuration of subscriber-side network equipment including a customer line optical network unit in the conventional technology.

As shown in FIG. 6, a network device 70, which is a subscriber-side network device, and a network device 80, which is a station-side network device, are connected through a subscriber-side network interface 71, a customer line optical network unit 72, an optical branching unit 75, an intra-station optical network unit 82, and a station-side network interface 81.

A description is given below of a transmission procedure for an optical burst transmission of a data signal P2MP by the subscriber-side network device 70 through the customer line optical network unit 72 toward the station-side network device 80 in the network configuration shown in FIG. 6 and FIG. 7.

Figure 7:
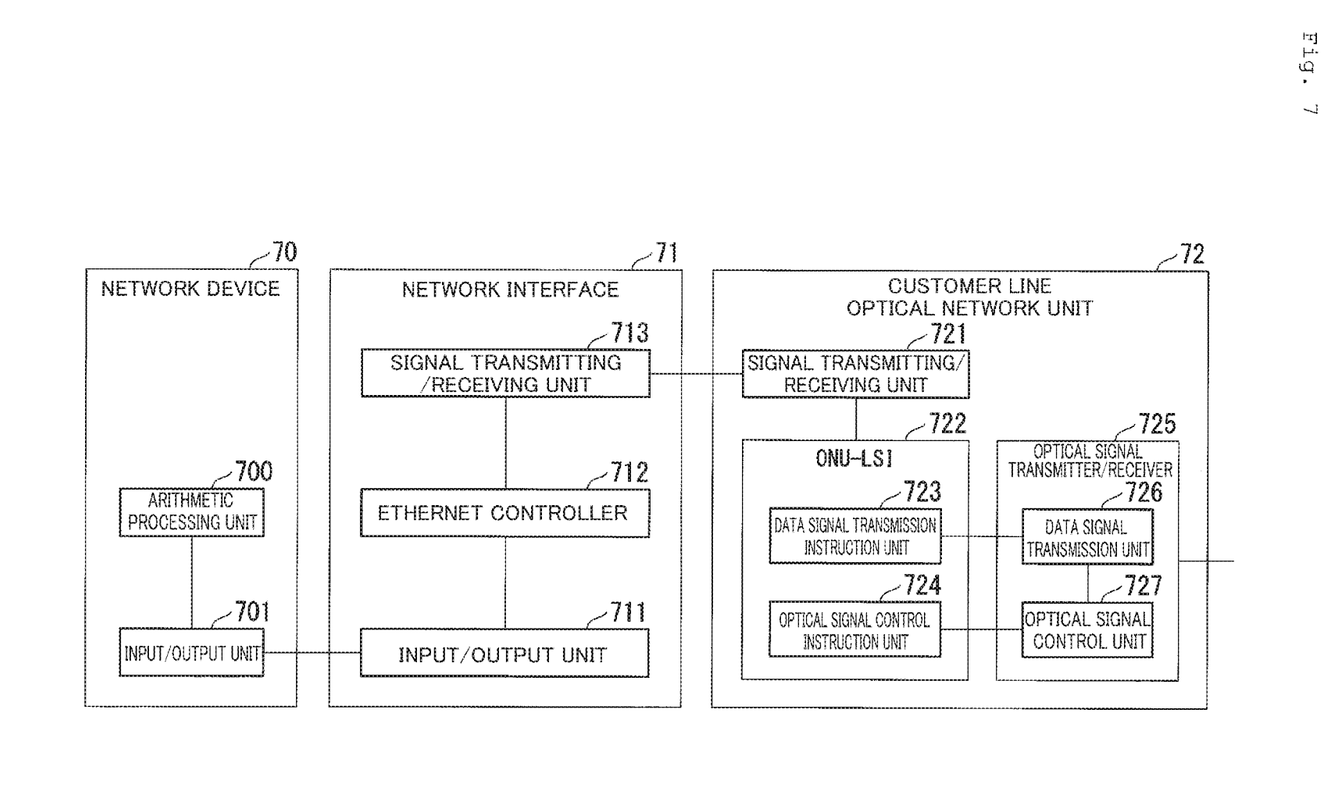
FIG. 7 is the simplest configuration of subscriber-side network equipment including an optical network unit in the conventional technology.

As shown in FIG. 7, in the network device 70, under control by an arithmetic processing unit 700, an input/output unit 701 transmits data to an input/output unit 711 of the network interface 71. The input/output unit 711 receives data transmitted from the input/output unit 701 and outputs the received data to an Ethernet controller 712. The Ethernet controller 712 acquires data transmitted from the input/output unit 711 and adds the acquired data with an Ethernet (registered trademark) header such as a destination MAC (Media Access Control) address and a source MAC address. The Ethernet controller 712 outputs to a signal transmitting/receiving unit 713 the data added with the Ethernet (registered trademark) header as a data signal that is an electrical signal. The signal transmitting/receiving unit 713 acquires a data signal output from the Ethernet controller 712 and transmits the acquired data signal to a signal transmitting/receiving unit 721 of the customer line optical network unit 72.

The signal transmitting/receiving unit 721 receives data signal transmitted from the signal transmitting/receiving unit 713 and outputs the received data signal to an ONU-LSI 722 (Optical Network Unit Large Scale integration). The ONU-LSI 722 acquires a data signal output from the signal transmitting/receiving unit 721 and provides the acquired data signal with data processing for PON communication. The ONU-LSI 722 allows a data signal transmission instruction unit 723 to output the data signal provided with data processing to a data signal transmission unit 726 of an optical signal transmitter/receiver 725. In addition, the ONU-LSI 722 allows an optical signal control instruction unit 724 to output to an optical signal control unit 727 of an optical signal transmitter/receiver 725 an instruction (optical signal control instruction) to control the transmission of an optical signal toward the network device 80. The ONU-LSI 722 outputs the optical signal control instruction to the optical signal control unit 727 from the optical signal control instruction unit 724 in response to a timing at which the data signal transmission instruction unit 723 outputs data signal to the data signal transmission unit 726.

The optical signal control unit 727 transmits an optical signal toward the network device 80 according to the optical signal control instruction transmitted from optical signal control instruction unit 724. Specifically, the optical signal control unit 727 transmits an optical signal toward the network device 80 by switching ON/OFF of the optical pulse on the basis of the values of 0 and 1 of the data signal (electrical signal) acquired from the data signal transmission instruction unit 723 by the data signal transmission unit 726. In the above configuration, the customer line optical network unit 72 transmits the data output from the network device 70 to the network device 80 as an optical burst signal.

CITATION LIST

Non Patent Literature

[NPL 1] "IEEE Standard for Ethernet SECTION 1", IEEE Std 802.3TM7-2015", IEEE Computer Society, pp. 54-169, 2015

[NPL 2] "IEEE Standard for Ethernet SECTION 3", IEEE Std 802.3TM-2015", IEEE Computer Society, pp. 16-174, 2015

[NPL 3] "IEEE Standard for Ethernet SECTION 4", IEEE Std 802.3TM-2015", IEEE Computer Society, pp. 38-564, 2015

[NFL 4] "IEEE Standard for Ethernet SECTION 6", IEEE Std 802.3TM-2015", IEEE Computer Society, pp. 77-586, 2015

[NFL 5] "IEEE Standard for Ethernet SECTION 5", IEEE Std 802.3TM-2015", IEEE Computer Society, pp. 35-386, 2015

SUMMARY OF THE INVENTION

Technical Problem

The optical network unit large scale integration (ONU-LSI 722) for achieving the optical burst transmission of the data signal is generally less distributed and has lower availability than the standard network device such as the Ethernet controller 712. Therefore, there is a need to achieve, without using the optical network unit large scale integration, the optical TDMA communication in a network configuration that includes a plurality of subscriber-side network devices connected using PON topology. Unfortunately, in a conventional network configuration that does not use the optical network unit large scale integration, the optical burst transmission cannot be performed, so that the optical signals transmitted from the subscriber-side network devices collide at an optical signal meeting point. Thus, the station-side network device may not receive the optical signals normally. In other words, there has been a problem that the optical TDMA communication cannot be achieved by only an integrated circuit designed for the P2P communication (for example, an Ethernet controller equipped to the standard network device).

The present invention was accomplished in light of the above-mentioned circumstances and a purpose thereof is to provide a transmitting device and a transmission method that may perform optical TDMA communication without using an optical network unit large scale integration.

Means for Solving the Problem

One aspect of the present invention is a transmitting device used in an optical access system in which a plurality of the transmitting devices transmit an optical burst signal to a receiving device by time division multiple access, the transmitting device including an arithmetic processing unit, the arithmetic processing unit including: a data signal transmission instruction unit that outputs a first instruction for controlling transmission processing of a data signal on the basis of a requester's instruction; an optical signal control instruction unit that outputs a second instruction for controlling output processing of an optical signal on the basis of the requester's instruction; and an instruction output adjustment unit that adjusts a timing at which the first instruction is output and a timing at which the second instruction is output.

In addition, one aspect of the present invention is the transmitting device according described above, further including an Ethernet controller achieving communication as Ethernet (registered trademark), wherein the Ethernet controller includes an optical signal output control unit that acquires the second instruction output from the optical signal control instruction unit and controls output processing of the optical signal by an optical signal transmitter/receiver on the basis of the second instruction.

In addition, one aspect of the present invention is the transmitting device described above, wherein the arithmetic processing unit further includes an optical signal output control unit that acquires the second instruction output from the optical signal control instruction unit and controls output processing of the optical signal by an optical signal transmitter/receiver on the basis of the second instruction.

In addition, one aspect of the present invention is the transmitting device described above, further including an Ethernet controller achieving communication as Ethernet (registered trademark) and a control circuit different from the Ethernet controller, wherein the control circuit further includes an optical signal output control unit that acquires the second instruction output from the optical signal control instruction unit and controls output processing of the optical signal by an optical signal transmitter/receiver on the basis of the second instruction.

In addition, one aspect of the present invention is a transmission method by a transmitting device used in an optical access system in which a plurality of the transmitting devices transmit an optical burst signal to a receiving device by time division multiple access, the transmission method including: a data signal transmission instruction step of outputting a first instruction for controlling transmission processing of a data signal on the basis of a requester s instruction; an optical signal control instruction step of outputting a second instruction for controlling output processing of an optical signal on the basis of the requester's instruction; and an instruction output adjustment step of adjustment a timing at which the first instruction is output and a timing at which the second instruction is output.

Effects of the Invention

The present invention may perform the optical TDMA communication without using an optical network unit large scale integration.

DESCRIPTION OF EMBODIMENTS

First Embodiment

A first embodiment of the present invention will be described below with reference to the drawings.

[Entire Configuration of Communication System]

Figure 1:
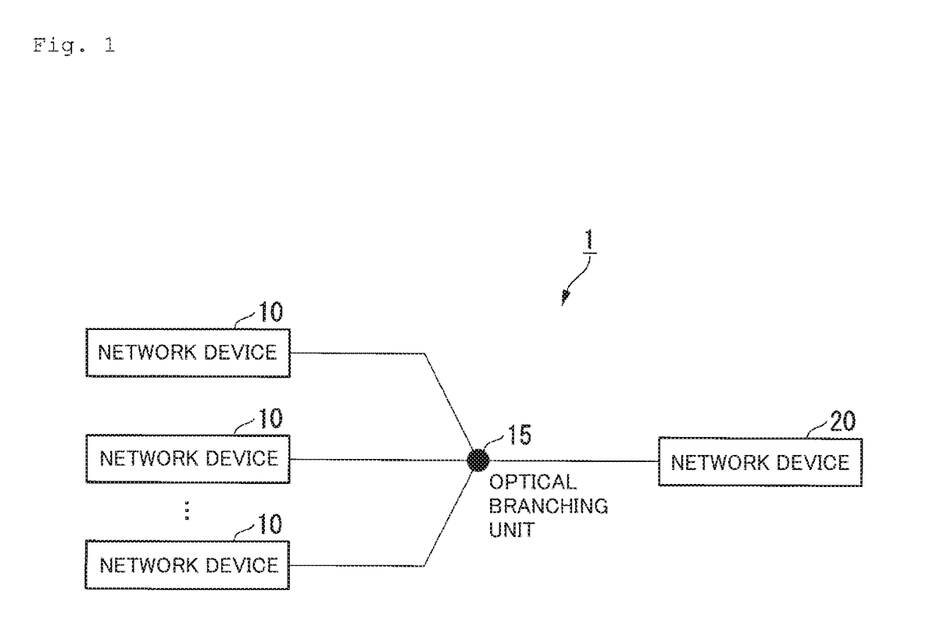
FIG. 1 is an entire configuration diagram of a communication system according to a first embodiment.

An entire configuration of a communication system will be described below. FIG. 1 is the entire configuration diagram of a communication system 1 according to the first embodiment. As shown in FIG. 1, the communication system 1 is configured by including a plurality of network devices 10 and a single network device 20. The communication system 1 is a network system that connects the network devices 10 and the single network device 20 using PON topology. Each of the network devices 10 and the single network device 20 are communicatively connected via an optical branching unit 15.

Note that the network device 10 is a network device installed in a subscriber-side home and the network device 20 is a network device installed in a station facility. The facility where the network device 10 and the network device 20 are installed is not limited to those and may be any facility.

[Function Configuration of Subscriber-Side Network Device]

Figure 2:
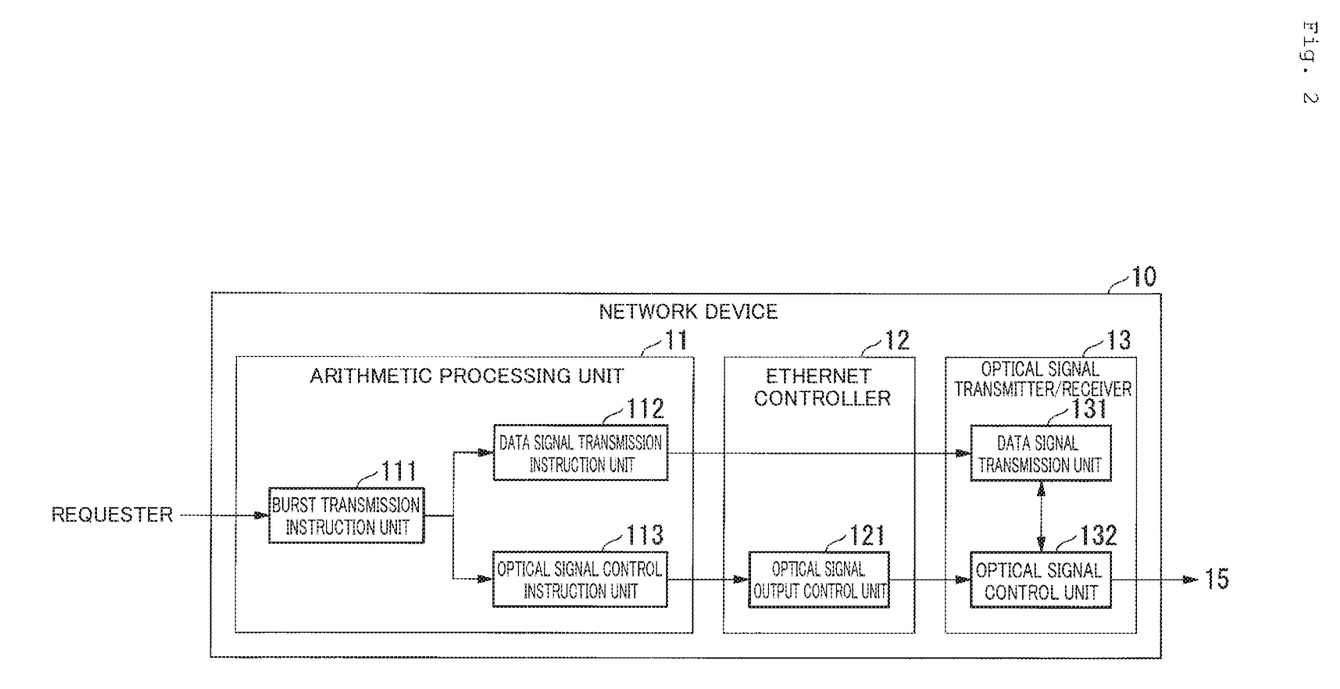
FIG. 2 is a block diagram of a function configuration of a subscriber-side network device of the communication system according to the first embodiment.

The function configuration of the subscriber-side network device will be described below. FIG. 2 its a block diagram of the function configuration of the subscriber-side network device 10 in the communication system 1 according to the first embodiment. As shown in FIG. 2, the network device 10 are configured by including an arithmetic processing unit 11, an Ethernet controller 12, and an optical signal transmitter/receiver 13.

The arithmetic processing unit 11 is configured by including, for example, a processor such as a CPU (Central Processing Unit). As shown in FIG. 2, the arithmetic processing unit 11 is configured by including a burst transmission instruction unit 111, a data signal transmission instruction unit 112, and an optical signal control instruction unit 113.

The Ethernet controller 12 is an integrated circuit implemented on a network interface or a network device. Ethernet controller 12 has a function of processing protocols of a PHY layer (physical layer) and a MAC layer in Ethernet (registered trademark).

Note that it is supposed that the Ethernet controller 12 does not have a function of processing the protocol of an MPCP (Multipoint MAC CONTROL) layer. As shown in FIG. 2, the Ethernet controller 12 is configured by including an optical signal output control unit 121.

The optical signal transmitter/receiver 13 is a device having a function of a PMD (Physical Media Dependent) that may output an electrical signal as an optical signal. The optical signal transmitter/receiver 13 is configured by including, for example, an optical module that is compliant with standards such as SFP (Small Form-factor Pluggable/Mini-GBIC) or SFP+, or an optical module implemented on a printed circuit board or the like. As shown in FIG. 2, the optical signal transmitter/receiver 13 is configured by including a data signal transmission unit 131 and an optical signal control unit 132.

The arithmetic processing unit 11 acquires data transmitted from a requester that requests data transmission.

When the arithmetic processing unit 11 acquires data, the burst transmission instruction unit 111 outputs respective control start instructions to the data signal transmission instruction unit 112 and the optical signal control instruction unit 113.

Here, the burst transmission instruction unit 111 transmits the control start instruction, after adjusting a timing at which the control start instruction is output to the data signal transmission instruction unit 112 and a timing at which the control start instruction is output to the optical signal control instruction unit 113. The timing for these two control start instructions is calculated by considering a delay time from the flow start to the optical signal and frame transmission. Thus, the network device 10 may transmit a data signal to the network device 20 via an optical burst signal without loss.

Upon input of the control start instruction, the data signal transmission instruction unit 112 starts transmission processing for data that is transmitted from the requester and waiting for transmission (hereinafter, "transmission waiting data"). Note that it is supposed that transmission waiting data is stored in the arithmetic processing unit 11 or a temporary storage medium (not shown) included in other function blocks in the network device 10. The data signal transmission instruction unit 112 outputs a data signal transmission instruction for performing transmission of a data signal and data subjected to transmission processing toward the data signal transmission unit 131 of the optical signal transmitter/receiver 13.

Note that, like general communication by Ethernet (registered trademark) the data subjected to transmission processing is output through the Ethernet controller 12 to the data signal transmission unit 131 of the optical signal transmitter/receiver 13. The Ethernet controller 12 provides data with the Ethernet (registered trademark) header such as the destination MAC address and source MAO address Data provided with the Ethernet (registered trademark) header is output from the Ethernet controller 12 to the data signal transmission unit 131 as a data signal that is an electrical signal.

Upon input of the control start instruction, the optical signal control instruction unit 113 outputs to the optical signal output control unit 121 of the Ethernet controller 12 an optical signal control instruction for performing control of output of the optical signal.

Upon input of the above control instruction, the optical signal output control unit 121 controls the optical signal control unit 132 of the optical signal transmitter/receiver 13 according to the input control instruction to control the output and quenching of the optical signal.

The optical signal control instruction unit 113 controls the output of the optical signal according to the data signal output from the data signal transmission instruction unit 112 to the data signal transmission unit 131. Specifically, under control by the optical signal output control unit 121, the optical signal control unit 132 switches ON/OFF of the optical pulse on the basis of the values of 0 and 1 of the data signal (electrical signal) input to the data signal transmission unit 131. Thus, the optical signal is transmitted toward the station-side network device 20. By the above configuration, the network device 10 may transmit a data signal to the network device 20 as an optical burst signal without using the optical network unit.

After completing the transmission of the transmission waiting data, the burst transmission instruction unit 111 outputs respective information that indicates control end instruction to the data signal transmission instruction unit 112 and optical signal control instruction unit 113.

The above burst transmission instruction unit 111, data signal transmission instruction unit 112, and optical signal control instruction unit 113 are software programs performed by a processor (such as CPU, for example) included in the arithmetic processing unit 11. Thus, the network device 10 performs optical burst transmission of a data signal as an Ethernet (registered trademark) frame through the Ethernet controller 12 by the software control by the arithmetic processing unit 11.

[Operation of Subscriber-Side Network Device]

Figure 3:
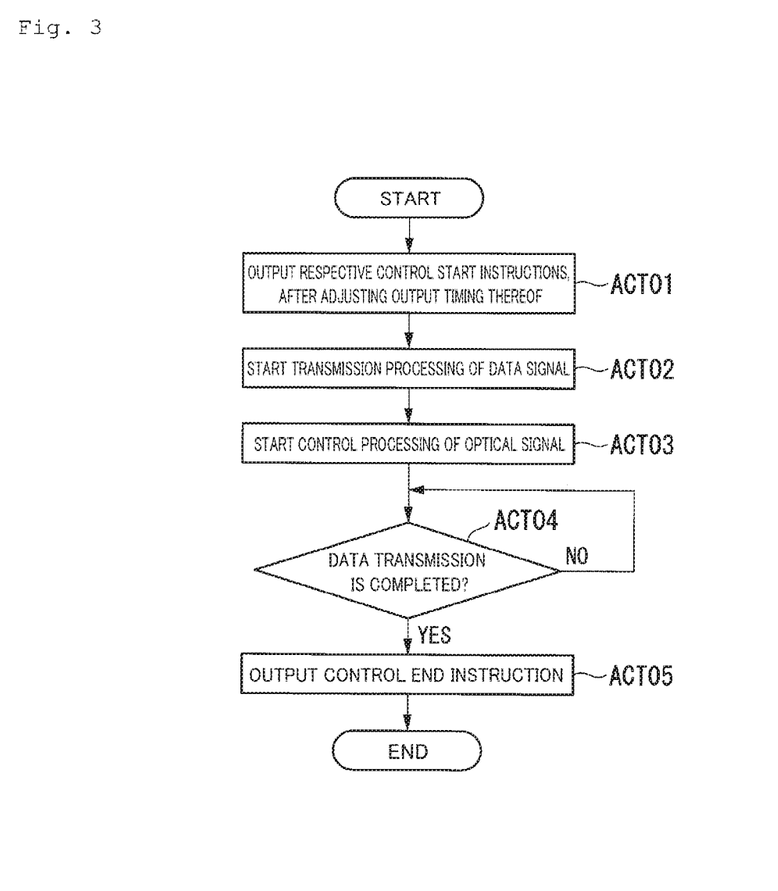
FIG. 3 is a flowchart of an operation of the subscriber-side network device of the communication system according to the first embodiment.

The Operation of the subscriber-side network device will be described below. FIG. 3 is a flowchart showing an operation of the subscriber-side network device 10 of the communication system 1 according to the first embodiment.

The arithmetic processing unit 11 acquires data (transmission waiting data) transmitted from a requester that requests data transmission. When the arithmetic processing unit 11 acquires the transmission waiting data, the burst transmission instruction unit 111 outputs the respective control start instructions, after adjusting the output timing thereof, to the data signal transmission instruction unit 112 and the optical signal control instruction unit 113 (ACT01).

Upon input of the control start instruction, the data signal transmission instruction unit 112 starts transmission processing of a data signal that indicates transmission waiting data (ACT02).

Upon input of the control start instruction, the optical signal control instruction unit 113 outputs to the optical signal output control unit 121 of the Ethernet controller 12 an optical signal control instruction for performing control of output of the optical signal. Upon input of the control instruction, the optical signal output control unit 121 controls the optical signal control unit 132 of the optical signal transmitter/receiver 13 according to the input control instruction to start control processing of the output and quenching of the optical signal (ACT03).

If the data transmission of the transmission waiting data is not completed (ACT04/NO), the transmission processing is continued. If the data transmission is completed (ACT04/YES), the burst transmission instruction unit 111 outputs respective information that indicates control end instruction to the data signal transmission instruction unit 112 and the optical signal control instruction unit 113, (ACT05).

As described above, the processing by the network device 10 shown in the flowchart in FIG. 3 is completed.

Second Embodiment

A second embodiment of the present invention will be described below with reference to the drawings.

[Function Configuration of Subscriber-Side Network Device]

Figure 4:
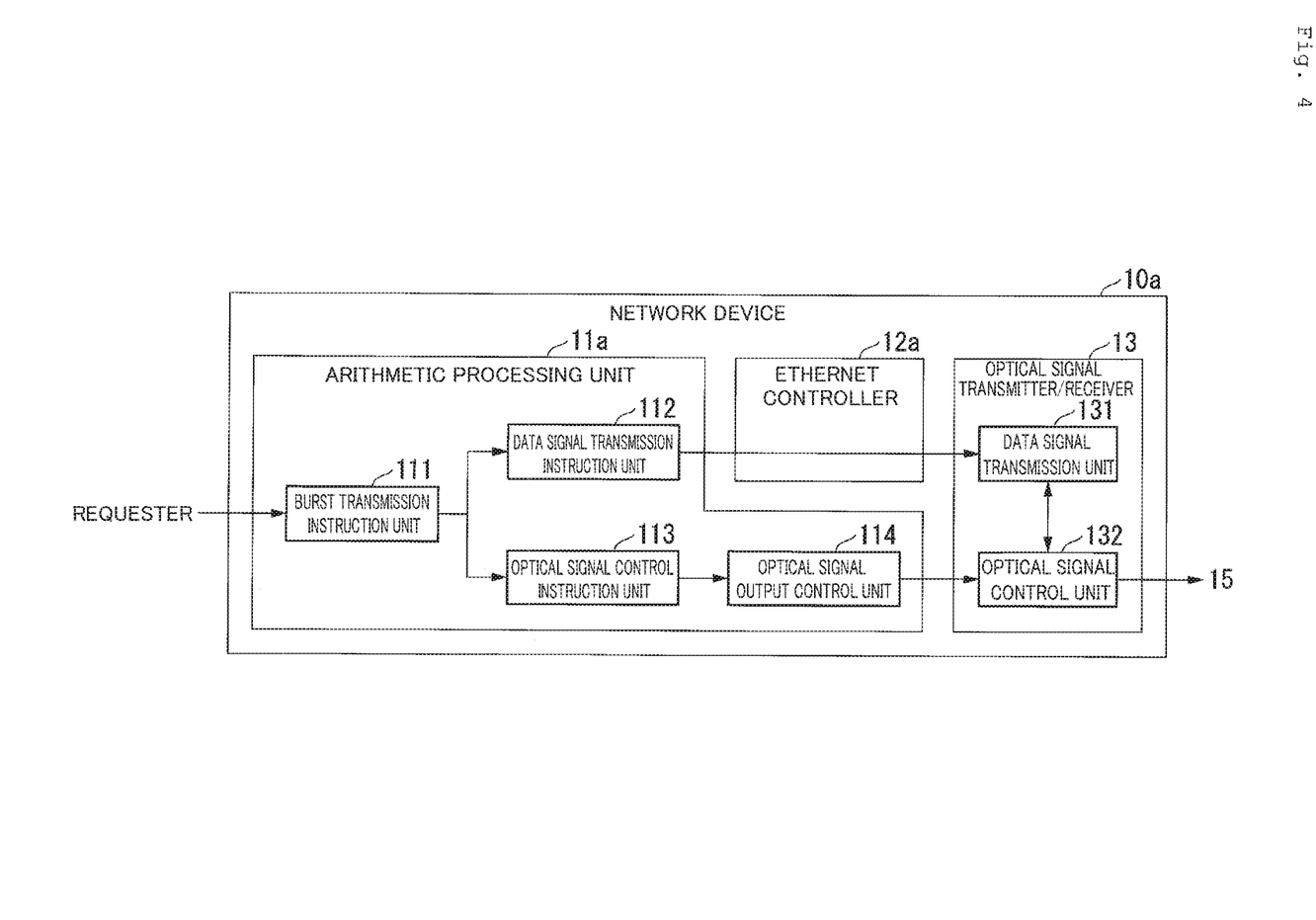
FIG. 4 is a block diagram of a function configuration of a subscriber-side network device of a communication system according to a second embodiment.

The function configuration of the subscriber-side network device will be described below. FIG. 4 is a block diagram of the function configuration of a subscriber-side network device 10a of the communication system according to the second embodiment. Note that the entire configuration diagram of the communication system according to the second embodiment is similar to the entire configuration diagram of the communication system according to the second embodiment, so its detailed description is omitted here.

The network device 10a and the network device 10 according to the first embodiment whose function configuration is shown in FIG. 2 are functionally different in that in the network device 10a, an Ethernet controller 12a does not include the optical signal output control unit 121, and an arithmetic processing unit 11a includes an optical signal output control unit 114.

In the network device 10a according to the second embodiment, the arithmetic processing unit 11a controls the output and quenching of the optical signal by directly controlling the optical signal control unit 132 instead of indirectly controlling the optical signal control unit 132 through the Ethernet controller or the like.

Third Embodiment

A third embodiment of the present invention will be described below with reference to the drawings.

[Function Configuration of Subscriber-Side Network Device]

Figure 5:
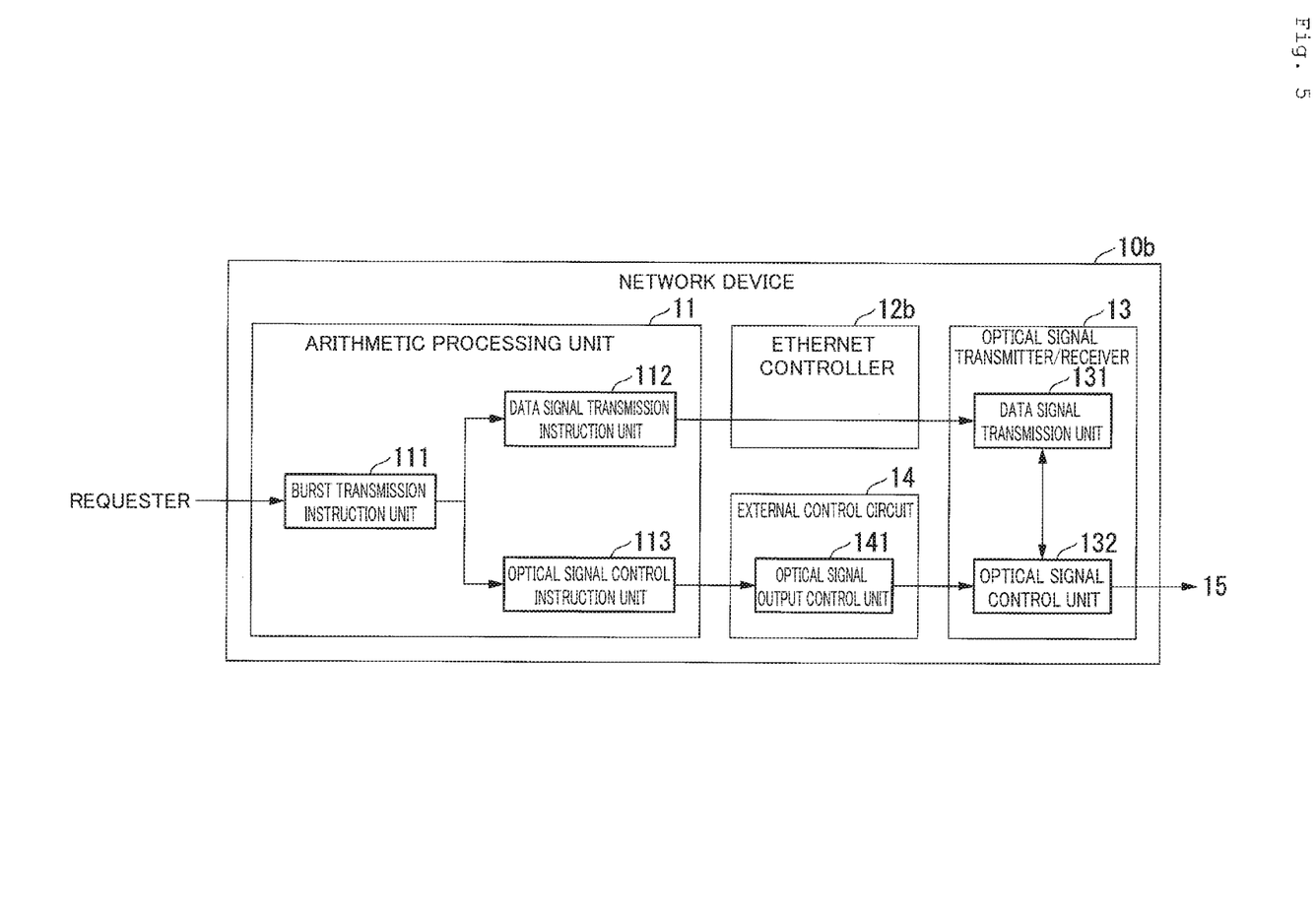
FIG. 5 is a block diagram of a function configuration of a subscriber-side network device of a communication system according to a third embodiment.

The function configuration of the subscriber-side network device will be described below. FIG. 5 is a block diagram of the function configuration of a subscriber-side network device 10b of the communication system according to the third embodiment. Note that the entire configuration diagram of the communication system according to the third embodiment is similar to the entire configuration diagram of the communication system according to the second embodiment, so its detailed description is omitted here.

The network device 10b and the network device 10 according to the first embodiment, the function configuration of which is shown in FIG. 2, are functionally different in that the network device 10b includes an external control circuit 14 that includes an optical signal output control unit 141, while an Ethernet controller 12b does not include an optical signal output control unit.

The external control circuit 14 is an integrated circuit that may be connected to the arithmetic processing unit 11 and the optical signal transmitter/receiver 13 via an input/output interface. The external control circuit 14 is configured by including, for example, an FPGA (Field-Programmable Gate Array) board or the like. In addition, the optical signal output control unit 141 is a function implemented in the external control circuit 14. Upon input of the control instruction from the optical signal control instruction unit 113, the optical signal output control unit 141 controls the optical signal control unit 132 of optical signal transmitter/receiver 13 according to the input control instruction to control the output and quenching of the optical signal.

Note that the Ethernet controller 12b processes protocols of a PRY layer (physical layer) and a MAC layer Ethernet (registered trademark). As described above, unlike the first embodiment, in the subscriber-side network device 10b of the communication system the according to the third embodiment, the function of communicating as Ethernet (registered trademark) is implemented in the Ethernet controller 12b, and the external control circuit 14 controls the output and quenching of the optical signal.

In the network device 10b according to the third embodiment, the optical signal control instruction unit 113 controls the output and quenching of the optical signal by controlling the optical signal control unit 132 via the optical signal output control unit 141 of the external control circuit 14.

As described above, the subscriber-side network device 10 (10a, 10b) according to the above embodiments is the subscriber-side network device 10 (10a, 10b) in the communication system 1 (optical access system) in which a plurality of the network devices 10 (10a, 10b) (transmitting devices) transmit the optical burst signal to the station-side network device 20 (receiving device) by the optical TDMA (time division multiple access) communication. The subscriber-side network device 10 (10a, 10b) includes an arithmetic processing unit 11, the arithmetic processing unit 11 including: a data signal transmission instruction unit 112 for outputting a data signal transmission instruction (first instruction) to control transmission processing of a data signal on the basis of a requester s instruction; an optical signal control instruction unit 113 for outputting an optical signal control instruction (second instruction) to control output processing of the optical signal on the basis of a requester's instruction; and a burst transmission instruction unit 111 (instruction output adjustment unit) for adjusting output timing of the data signal transmission instruction and optical signal control instruction.

Here, the burst transmission instruction unit 111, the data signal transmission instruction unit 112, and the optical signal control instruction unit 113 are software programs performed by a processor included in the arithmetic processing unit 11, as described above. Thus, the network device may perform the optical burst transmission of a data signal as an Ethernet (registered trademark) frame via the Ethernet controller by a software subjected to control processing in the arithmetic processing unit.

By the above configuration, the subscriber-side network device 10 (10a, 10b) according to the above embodiments may perform the optical TDMA communication without using an optical network unit large scale integration and transmit a data signal via an optical burst signal without loss.

Note that for simply illustrating the features of the present invention, the above description describes the network device 10 (10a, 10b) as a "transmitting device" and the network device 20 as a "receiving device". Nevertheless, the communication system according to the above embodiments is a general network system that connects a plurality of the network devices 10 and the single network device 20 using PON topology and it is obviously also possible to communicate from the network device 20 to the network device 10 (10a, 10b).

While the embodiments of this invention have been described in detail with respect to the drawings, specific configurations are not limited to these embodiments and any design may also be included without departing from the spirit of the invention.

Note that some or all of the network device 10 (10a, 10b) in the above embodiments may be achieved by a computer. This may be done by recording a program for achieving the control function in a computer-readable storage medium and causing a computer system to read and perform the program recorded in the recording medium.

Note that here "a computer system" may refer to a computer system built in the network device 10 (10a, 10b) that includes an OS and hardware such as peripheral equipment. In addition, "a computer-readable storage medium" may refer to a storage device including portable media such as a flexible disk, a magneto-optical disk, a ROM, and a CD-ROM, and a hard disk built in a computer system.

Further, "a computer-readable storage medium" may include a storage medium that may hold a program dynamically for a short period of time, like a communication line when transmitting a program through a network such as the Internet or a communication line such as a telephone line, or a storage medium that may hold a program for a certain amount of time, like a volatile memory inside a server or client computer system when transmitting through the communication line. The above program may be for achieving some of the above function and may also achieve the above function in combination with a program already recorded in a computer system.

In addition, some or all of the network device 10 (10a, 10b) in the above embodiments may be achieved as an integrated circuit such as an LSI (Large Scale Integration). The function blocks in the network device 10 (10a, 10b) may be achieved individually in a processor or some or all thereof may be integrated into a processor. In addition, the technique of achieving by an integrated circuit may not be limited to an LSI and be achieved by a dedicated circuit or a general processor. In addition, when the advance of the semiconductor technology provides an integrated circuit technology alternative to the LSI, as integrated circuit according to the technology may be used.

REFERENCE SIGNS LIST

1 Communication system
10, 10a, 10b Network device
11 Arithmetic processing unit
12, 12a, 12b Ethernet controller
13 Optical signal transmitter/receiver
14 External control circuit
15 Optical branching unit
20 Network device
111 Burst transmission instruction unit
112 Data signal transmission instruction unit
113 Optical signal control instruction unit
121 Optical signal output control snit
131 Data signal transmission unit
132 Optical signal control unit
141 Optical signal output control unit

The invention claimed is:

1. A transmitting device in an optical access system in which the transmitting device transmits an optical burst signal to a receiving device by time division multiple access, comprising:

an arithmetic processing unit having a processor; and a storage medium having computer program instructions stored thereon, when executed by the processor, perform to:

output a first instruction for controlling transmission processing of a data signal on the basis of a requester's instruction; outputs a second instruction for controlling output processing of an optical signal on the basis of the requester's instruction; and adjusts a timing at which the first instruction is output and a timing at which the second instruction is output; and an Ethernet controller achieving communication as Ethernet (registered trademark), wherein the Ethernet controller comprises an optical signal output control unit that acquires the second instruction output from the arithmetic processing unit and controls output processing of the optical signal by an optical signal transmitter/receiver on the basis of the second instruction.

2. A transmitting device in an optical access system in which the transmitting device transmits an optical burst signal to a receiving device by time division multiple access, comprising:

an arithmetic processing unit having a processor; and a storage medium having computer program instructions stored thereon, when executed by the processor, perform to:

output a first instruction for controlling transmission processing of a data signal on the basis of a requester's instruction; outputs a second instruction for controlling output processing of an optical signal on the basis of the requester's instruction; and adjusts a timing at which the first instruction is output and a timing at which the second instruction is output; and an Ethernet controller that achieves communication as Ethernet (registered trademark) and a control circuit that is different from the Ethernet controller, wherein the control circuit further comprises an optical signal output control unit that acquires the second instruction output from the arithmetic processing unit and controls output processing of the optical signal by an optical signal transmitter/receiver on the basis of the second instruction.

* * * * *